(12) United States Patent
Harshavardhana et al.

(10) Patent No.: US 6,545,977 B2
(45) Date of Patent: *Apr. 8, 2003

(54) METHODS AND APPARATUS FOR ROUTING SIGNALS IN A RING NETWORK

(75) Inventors: Paramasiviah Harshavardhana, Marlboro, NJ (US); Srinivasan S. Ravikumar, Morristown, NJ (US); Yufei Wang, Holmdel, NJ (US)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/090,083
(22) Filed: Jun. 3, 1998

(65) Prior Publication Data

US 2001/0012298 A1 Aug. 9, 2001

(51) Int. Cl.[7] ............................................... G01R 31/08
(52) U.S. Cl. ...................................... 370/222; 370/404
(58) Field of Search .................................. 370/222, 223, 370/224, 238, 254, 258, 400, 351, 452, 401, 402, 403, 404, 405

(56) References Cited

U.S. PATENT DOCUMENTS

| | | | | |
|---|---|---|---|---|
| 5,299,207 A | * | 3/1994 | Fujii | 714/45 |
| 5,394,389 A | * | 2/1995 | Kremer | 370/223 |
| 5,406,549 A | * | 4/1995 | Kremer | 370/224 |
| 5,546,542 A | * | 8/1996 | Cosares et al. | 709/241 |
| 5,742,774 A | * | 4/1998 | Al-Salameh et al. | 709/251 |
| 5,815,489 A | * | 9/1998 | Takatori et al. | 370/217 |
| 6,021,113 A | * | 2/2000 | Doshi et al. | 370/228 |
| 6,034,798 A | * | 3/2000 | Oberg | 359/119 |
| 6,073,248 A | * | 6/2000 | Doshi et al. | 714/4 |
| 6,111,941 A | * | 8/2000 | Schreyer | 379/207 |

OTHER PUBLICATIONS

B. Doshi et al., "Dual Ring Interworking: High Penalty Cases and How to Avoid Them," Proceedings of ITC 15, Jun., 1997.
C. Buyukkoc, "Load Balancing on SONET Rings," Proceedings of ICT '96, Istanbul, pp. 763–766, 1996.
S. Cosares and I. Saniee, "An Optimization Problem Related to Balancing Loads on SONET Rings," Telecommunication Systems, vol. 3, pp. 165–181, 1994.
B. Doshi et al., "Overview of INDT—A New Tool for Next Generation Network Design," Proceedings of IEEE Globecom, Nov. 1995.

* cited by examiner

Primary Examiner—Wellington Chin
Assistant Examiner—Brenda Pham
(74) Attorney, Agent, or Firm—Ryan, Mason & Lewis, LLP

(57) ABSTRACT

Traffic demands are routed in a ring network by first determining an inter-ring path for a given demand, and then independently determining an intra-ring path for the demand on each of the rings in the inter-ring path. The intra-ring path provisioning is fully decoupled from the inter-ring path provisioning, such that the demand can be routed more quickly and efficiently. For example, both the routing direction and the interworking nodes for a dual ring interworking (DRI) connection can be determined independently for each of the rings of the inter-ring path. The invention may be implemented in the form of a hybrid centralized/distributed network architecture, in which a central operations system or other central controller determines the inter-ring path by applying a shortest path algorithm to a ring graph in which nodes represent rings in the network and links represent ring interconnections in the network. Ring controllers in the rings of the inter-ring path then each independently determine an intra-ring path for their corresponding rings. Although particularly well suited for use with DRI, the invention can also improve routing performance in single ring interworking (SRI) applications, as well as applications involving combinations of DRI and SRI.

18 Claims, 6 Drawing Sheets

METHODS AND APPARATUS FOR ROUTING SIGNALS IN A RING NETWORK

FIELD OF THE INVENTION

The present invention relates generally to signal routing techniques for use in optical networks and other types of networks, and more particularly to signal routing techniques for use in networks which are configured in the form of interconnected rings.

BACKGROUND OF THE INVENTION

Ring networks, such as networks based on synchronous optical network (SONET) rings, are becoming increasingly popular due to their fast restoration capability in the presence of node or link failures. A ring network may be viewed as any network which includes a set of interconnected rings of nodes. Ring network design usually involves the following basic steps: generation of candidate rings, ring selection, demand routing, and ring sizing and costing. For a given network including a set of rings and a set of node-to-node traffic demands, the routing aspect of ring network design generally involves routing each demand across the ring network from its source node to its destination node such that the overall network cost, as a function of the ring capacities required by the routing, is minimized.

There are two types of ring interconnections that are used in ring networks: single ring interworking (SRI) and dual ring interworking (DRI). SRI is a simple interworking technique which uses only one hub node serving as a gateway to move traffic from one ring to another. The hub node has to be a common node shared by the two rings. SRI for a given demand is uniquely defined by two rings and a hub node for that demand. There may be multiple common nodes between two rings, and any one of the common nodes can be used in SRI. Although SRI has the advantage of simplicity, it provides no protection against hub node failure. DRI is designed to overcome this reliability weakness at the price of higher complexity. In DRI, two hub nodes are selected from each ring and paired with the hub nodes on another ring. Cross-ring traffic is moved by sending two copies of a signal from one ring to the other via two hub pairs, with one copy sent on each hub pair. DRI is described in greater detail in, for example, B. Doshi et al, "Dual Ring Interworking: High Penalty Cases and How to Avoid Them," Proceedings of ITC Jun. 15, 1997. Unfortunately, conventional routing techniques for DRI are unable to provide optimal routing in many important applications.

Another problem with existing ring network routing techniques is that these techniques often must be implemented in a centralized manner. In a conventional ring network, the complete end-to-end path for a given demand is typically determined by a central provisioning operations system (OS). This type of centralized routing is required because the routing on a given pair of adjacent rings cannot be fully decoupled in a conventional ring network. In other words, a routing decision made with respect to one ring in the network may require changing the routing on another ring. As a result, conventional centralized routing techniques can severely limit the speed and scalability of the ring network. Unfortunately, existing distributed routing techniques are generally unable to provide minimum cost routing of point-to-point demands across a ring network using, for example, information available to local controllers of each individual ring.

SUMMARY OF THE INVENTION

The present invention solves the problems associated with conventional centralized routing of traffic demands over a SONET ring network or other type of ring network. In an illustrative embodiment, traffic demands are routed in a ring network by first determining an inter-ring path for a given demand from a source ring to a destination ring in the network, and then independently determining an intra-ring path for the demand on each of the rings in the inter-ring path. In accordance with the invention, intra-ring path provisioning may be fully decoupled from inter-ring path provisioning, such that the demand can be routed substantially more quickly and efficiently than has heretofore been possible using conventional fully-centralized routing. For example, both the routing direction and the interworking nodes for a dual ring interworking (DRI) connection can be determined independently for each of the rings of the inter-ring path. This provides an additional degree of freedom in routing decisions which considerably simplifies the routing process.

The invention may be implemented in the form of a hybrid centralized/distributed network architecture, in which a central operations system or other central controller determines the inter-ring path by applying a shortest path algorithm to a ring graph in which nodes represent rings in the network and links represent ring interconnections in the network. Ring controllers in the rings of the inter-ring path then each independently determine an intra-ring path for their corresponding rings. The ring controllers may also each provide information regarding current ring load to the central controller, such that the information can be used, for example, in determining optimal inter-ring paths for future demands. Once the central controller determines the inter-ring path, it transmits path information to the ring controllers of the rings in the inter-ring path. The information transmitted to a given ring may include, for example, an indication as to whether the given ring is a source ring, a destination ring or a transit ring, identifiers of its neighboring rings in the path, and an identifier and size of the demand.

Although the invention is particularly well suited for use with DRI, the invention can also improve routing performance in single ring interworking (SRI) applications, as well as applications involving combinations of DRI and SRI. Moreover, the invention is applicable to ring networks having arbitrary size, complexity and configuration.

DETAILED DESCRIPTION

Figure 1A:
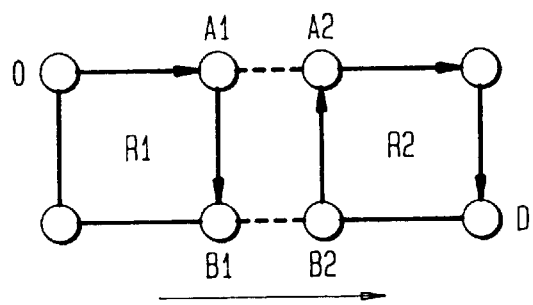
FIGS. 1A, 1B, 2A and 2B illustrate dual ring interworking (DRI) in a ring network.

The present invention will be illustrated below using a number of exemplary network configurations. It should be understood, however, that the invention is more generally suitable for use for in any type of ring network, including optical networks such as SONET ring networks as well as other types of optical or electrical networks. The term "ring network" as used herein is therefore intended to include any optical, electrical or other type of network which can be characterized as including two or more interconnected rings of nodes. The term "demand" as used herein is intended to refer not only a request for transmission capacity in a network, but also to the actual signal or signals to be transmitted over a particular path in accordance with such a request.

In accordance with the invention, the ring routing problem is decomposed into the following four subproblems: (i) assignment of demand end nodes to rings, (ii) inter-ring routing, (iii) intra-ring routing, and (iv) ring deloading. The following four sections address these subproblems in turn. In the last section, we describe a hybrid centralized-distributed architecture for provisioning end-to-end paths on ring networks which can be implemented using the ring routing methodology of the invention.

1. Assignment of Demand End Nodes to Rings

If one or both of the end nodes of a given demand belongs to multiple rings in a ring network, we need to select a source ring on which the routing starts and a destination ring on which the routing terminates. Our criterion for this selection is first to make the demand an intra-ring demand if possible, and second to minimize the total number of rings (i.e., the number of ring hops) on the route. A demand is said to be an "intra-ring demand" if the two end nodes are on the same ring. If a demand cannot be made an intra-ring demand, it is possible that there are multiple shortest ring hop paths, all with the same ring count. In order to uniquely select a path from such a set of multiple paths (and thus a source ring and a destination ring), we can utilize the following as tie-breaking criteria:

1. Minimum total delta violations: Let d be the size of the demand. For each ring r, let $C_r$ be its idle capacity which is defined as the minimum of the idle capacities of its links (zero if the ring is empty). If $d>C_r$, we say ring r has a delta violation with respect to demand d. The total delta violation of a path is the sum of delta violations of all the rings on the path.
2. Minimum total ring size in nodes: The size of a ring in nodes is defined as the total number of nodes on the ring. The total ring size of a path is the sum of ring sizes of all the rings on the path.
3. Minimum total ring size in distance: The size of a ring in distance is defined as its perimeter. Again, the total ring size of a path is the sum of ring sizes of all the rings on the path. The source-ring and destination-ring selection criteria described above can be implemented in conjunction with an inter-ring routing procedure which will be described in detail in the next section.

2. Inter-Ring Routing

An inter-ring route for a demand refers to a path of rings from the source ring to the destination ring such that every two consecutive rings on the path are properly interconnected. Inter-ring routing is not concerned with how a demand is routed inside a ring, i.e., intra-ring routing. To find an inter-ring path for a demand, we construct a graph in which nodes represent rings and links represent ring interconnections, and run a shortest path algorithm or other suitable path selection algorithm over this "ring graph." Properly setting up links in the ring graph is an important aspect of inter-ring routing. Therefore we need to model ring interconnections first. As noted above, there are two types of ring interconnections: single ring interworking (SRI) and dual ring interworking (DRI).

As described previously, SRI is a simple interworking method which uses only one hub node serving as a gateway to move traffic from one ring to another. The hub node has to be a common node shared by the two rings. SRI for a given demand is uniquely defined by two rings and a hub node for that demand. There could be multiple common nodes between two rings, and any one of them can be used in SRI. In addition, different demands might use different common nodes. Because of the simplicity of SRI, the construction of the ring graph mentioned above is straight forward: create a set of nodes, one for each ring; and create a link between two nodes if the two rings represented by the nodes share at least one common node. If a user doesn't want to interconnect two specific rings even if they have a common node, a flag can be set so that such a link will not be created.

Once the ring graph is created, inter-ring routing is simple: For each demand, find the shortest path (in terms of number of nodes) on the ring graph from the node of its source ring to the node of its destination ring. If there are multiple shortest paths, we generally want to keep as many of them as possible. However, a pre-specified parameter may be used to limit the maximum number of paths which can be stored in memory for each source-destination ring pair. If the total number of shortest paths exceeds the parameter, we arbitrarily pick a subset to keep. In the case that there are multiple choices for the source ring or for the destination ring as described in Section 1 above, we run the above-noted shortest path procedure for each possible source-destination ring combination and store the paths thus obtained in memory.

It should be pointed out that if two rings have multiple nodes in common, an inter-ring path generated by the above procedure does not specify which SRI (i.e., common node) to use. In order to reduce computational complexity of the inter-ring routing procedure, the SRI selection decision between two rings can be left to the intra-ring routing procedure. Furthermore, unless the inter-ring routing and the intra-ring routing are combined into one optimization problem (e.g. a linear programming (LP)-based approach), such decisions can be made more optimally at the time of intra-ring routing because more information is generally available at that time. Alternatively, the SRI inter-ring algorithm can specify which node to use for each SRI in case there are multiple common nodes between two rings, in order to provide a unified implementation architecture of ring routing for both SRI and DRI.

As described previously, SRI provides no protection against hub node failure, and DRI is designed to overcome this reliability weakness at the price of higher complexity. In DRI, two hub nodes are selected from each ring and paired with the hub nodes on the other ring. Cross-ring traffic is moved by sending two copies of a signal from one ring to the other via two hub pairs, one copy on each hub pair.

Figure 1B:
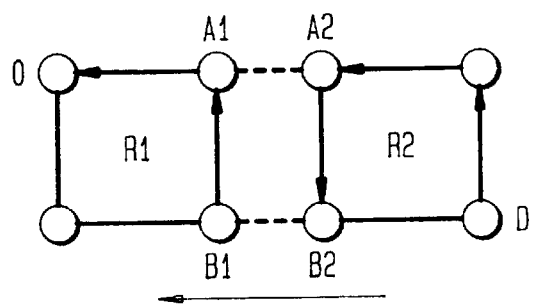

FIGS. 1A and 11B illustrate a DRI construct, with each showing traffic routing across the DRI in a particular direction. A portion of a ring network including two four-node rings R1 and R2 is shown, with ring R1 comprising nodes O, A1, B1 and one additional node, and ring R2 comprising nodes D, A2, B2 and one additional node. The large arrow in each of FIGS. 1A and 1B indicates the direction of signal flow for a demand. In FIG. 1A, a signal travels from origin node O to destination node D and crosses rings R1, R2 via two links: (A1, A2) and (B1, B2). On ring R1, a copy of the signal is made at A1 and crosses over to A2, as indicated by the dashed line between A1 and A2. The original signal then continues to B1 and crosses over to B2 as a second copy, as indicated by the dashed line between B1 and B2. On ring R2 the second copy loops back to A2 from B2. A2 thus receives two copies of the signal. Of the two copies, one is designated primary and the other secondary at the time of provisioning. If both copies are determined to be good, a signal selector at A2 picks up the primary. Otherwise, it selects the secondary. The selected copy of the signal then continues on ring R2 to D. The routing in the reverse direction is similar, as illustrated in FIG. 1B.

A DRI can thus be defined by specifying the following elements: two rings R1 and R2; two hub nodes A1 and B1 on R1; two hub nodes A2 and B2 on R2; and pairing of (A1, A2) and (B1, B2). It is usually assumed that A1 and B1 are adjacent on R1 and A2 and B2 are adjacent on R2. A minimum requirement of DRI is that one of the two hub pairs has to be a common node shared by two rings (i.e., either A1=A2 or B1=B2), although sometimes it may be desirable that both hub pairs are common nodes. If there is only one common node, the DRI is called common node DRI. Otherwise it is called common edge DRI. Suppose A1=A2 but B1≠B2 (i.e., a common node DRI). Then B1 and B2 are connected by a path through a mesh network. Such connections are referred to herein as low speed connections. In contrast, ring links are referred to as high speed links.

Signal selectors, one for each ring, are placed at appropriate hub nodes to pick one of the two copies of the signal to continue the routing. More specifically, one of nodes A1 and B1 on ring R1 is a signal selector node (SS) and another is a loop back node (LB). The same is true for nodes A2 and B2 on ring R2. The SS on R2 is for traffic routing from R1 to R2. The SS on R1 is for routing in the reverse direction. Note that SS placement uniquely specifies the routing direction on a ring. For example, having the SS at A2 in FIG. 1A forces clockwise routing in R2. If we want counterclockwise routing in R2, we should place the SS at B2.

Figure 2A:
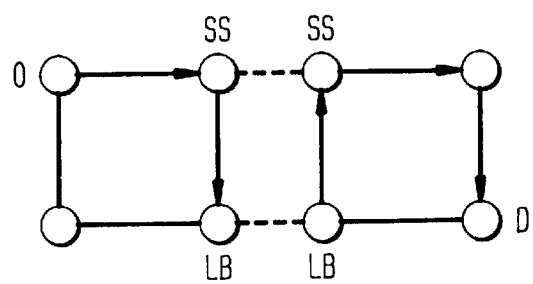
Figure 2B:
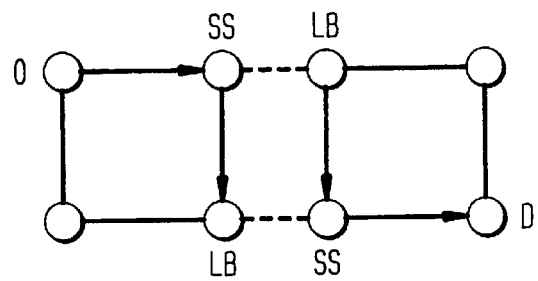

FIGS. 2A and 2B illustrate the manner in which different placement configurations of signal selectors result in two different types of routing, namely same side routing and opposite side routing. In same side routing, shown in FIG. 2A, both SSs are located in one hub pair. In opposite side routing, shown in FIG. 2B, the two SSs fall into two hub pairs, with one SS for each hub pair. Based on the above, the relationship between signal selector placement and direction of routing may be summarized as follows:

(1) In a DRI connecting rings R1 and R2, the traffic moving from R1 to R2 is always routed from SS to LB on R1 and from LB to SS on R2.

Distinguishing common edge vs. common node and same side routing vs. opposite side routing is important due to technology constraints. In the DRI definition given above, we intentionally leave signal selector placement and common node/common edge unspecified because not all possible configurations are valid. Which particular DRI configurations are valid depends on the technology constraints. The following is a list of exemplary technology constraints which can arise in a ring network:

1. Alarm indication signal (AIS) constraint: The primary signal has to cross rings via a common node.
2. Symmetry constraint: The primary signals in both directions have to traverse the same physical path.
3. Time slot assignment (TSA) constraint: No demand can traverse the same link twice.
4. Low speed transition constraint: Low speed to low speed connection is not allowed.
5. Low speed primary constraint: Signal selectors always take low speed signals as primary.

Constraint 1 implies that a DRI needs at least one common node. Constraint 2 itself does not impose any significant restriction in that we can always select primary paths in both directions appropriately such that they are on the same physical path. But Constraint 2 and Constraint 5 together rule out many possibilities. Constraint 3 implies that a signal cannot overlap on any link of a ring. Constraint 4 says that a signal cannot come into a node on a ring via a low speed link and leave the node via another low speed link without traversing a ring link at all. Constraint 5 is a limitation of current products of some vendors and is expected to be overcome soon. Therefore, we will describe two DRI models: a generic DRI (G-DRI) model and a restrictive DRI (R-DRI) model. The G-DRI model only considers the first four technology constraints while the R-DRI model enforces all five constraints. These two models will be described separately below. It should be emphasized that the constraints given above are exemplary only, and that the invention can be implemented in applications which are subject to other sets of constraints.

Figure 3:
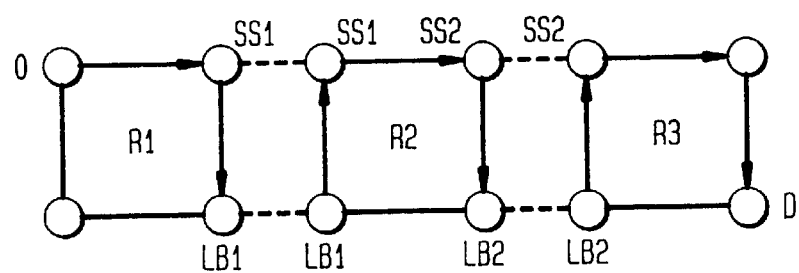
FIG. 3 shows the interconnection of multiple DRIs in a ring network.

Before describing the two DRI models, we need to introduce some issues concerning the interconnection of multiple rings using DRI. FIG. 3 illustrates an example of three rings interconnected by two DRIs: rings R1 and R2 are interconnected by a first DRI (denoted "DRI1") comprising hub nodes SS1 and LB1; and rings R2 and R3 are interconnected by a second DRI (denoted "DRI2") comprising hub nodes SS2 and LB2. It should be noted that not every possible placement of SSs and LBs results in a valid interconnection of the two DRIs. Based on (1), the direction of routing on R2 is uniquely determined by DRI1 (LB1→SS1) and also uniquely determined by DRI2 (SS2→LB2). Therefore, in order for the interconnection to be valid, both (LB1→SS1) and (SS2→LB2) have to imply the same direction. This result is summarized as follows:

(2) Let R2 be an intermediate ring in a chain of rings interconnected by DRIs. Let SS1 and LB1 (SS2 and LB2) be the signal selector and loop back nodes of R2's entering DRI (exiting DRI). Then (LB1→SS1) and (SS2→LB2) have to point to the same direction on R2.

By (2), the direction of routing on R2 should be LB1→SS1→SS2→LB2→LB1. It can be seen that, among these four nodes, only SS1 and SS2, or LB1 and LB2, can overlap. It will now be shown that, due to technology constraints, SS1 and SS2 cannot overlap.

Figure 4:
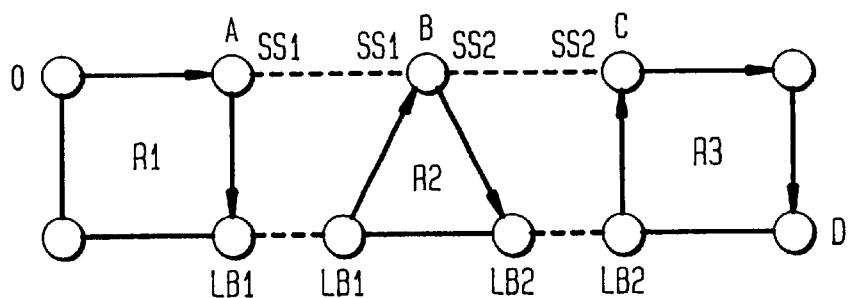
FIGS. 4 and 5 show invalid and valid interconnections, respectively, of two DRIs.
Figure 5:
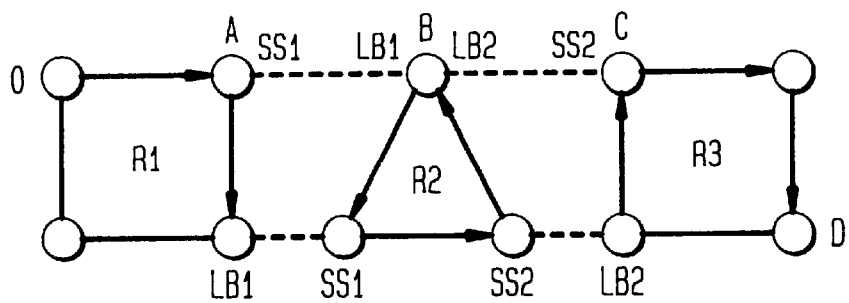

FIG. 4 shows two DRIs interconnecting three rings. DRI1 with SS1 and LB1 interconnects R1 and R2. DRI2 with SS2 and LB2 interconnects R2 and R3. If signal selectors are placed on ring R2 as shown in FIG. 4, a copy of the signal can cross the rings directly from node A to node B to node C. Since links AB and BC are two low speed links, this routing is a violation of Constraint 4, the low speed to low speed constraint. This result is summarized as follows:

(3) Let R2 be an intermediate ring in a chain of rings interconnected by DRIs. Let SS1 and LB1 (SS2 and LB2) be the signal selector and loop back nodes of R2's entering DRI (exiting DRI). Then SS1 and SS2 have to be distinct nodes, or equivalently, only LB1 and LB2 can overlap.

The G-DRI model will now be described in greater detail. As noted above, the G-DRI model enforces only the first four of the exemplary technology constraints previously described. We have discovered that the fifth constraint, the low speed primary constraint, turns out to be fundamentally different from the first four, and hence treating them separately is beneficial. We have also discovered that the only significant limitation imposed by the first four constraints is the common node requirement (which is already part of the DRI definition given above), and therefore DRI subject to the first four constraints can be modeled in a manner similar to that described above for SRI.

Figure 6A:
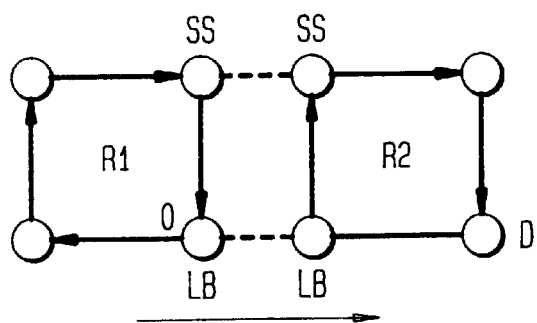
FIGS. 6A and 6B illustrate DRIs in which a signal starts/terminates at a hub node.
Figure 6B:
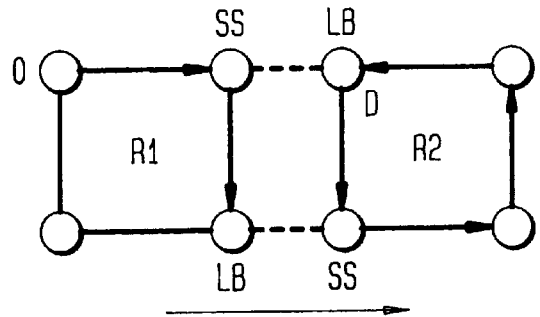

In the G-DRI model, no matter how the signal selectors are placed, we can always label the path which crosses the rings via a common node as primary. This can be done in both forward and reverse directions. Thus Constraints 1 and 2 are satisfied. Constraint 3 is always satisfied as long as the signal enters or leaves the ring at proper nodes. The only exception therefore is when a signal enters or leaves the ring at a DRI hub node. Suppose a G-DRI interconnects rings R1 and R2 and a signal enters ring R1 at the LB node of the DRI shown in FIG. 6A. Since the direction of routing on R1 is uniquely determined by SS→LB, the signal cannot go directly to SS from LB. It instead has to take the "long way" to get to SS, then it drops a copy at SS, continues to LB and leaves R1 at that point. In fact, the signal loops through the entire ring. Nevertheless, this is a valid routing because there is no overlap in the signal's path. A symmetric routing can be constructed for a case in which the signal terminates at the LB node of R2, as shown in FIG. 6B. On the other hand, if a signal enters R1 at the SS node of the DRI, it has to traverse R1 in the direction of SS→LB. By the DRI definition, it has to drop a copy at SS before it does at LB. It cannot drop a copy right after it enters the SS node from a low speed link because otherwise it would be a low speed to low speed connection. Therefore the signal has to loop through the entire ring and get back to SS, then continue to LB. This means that the signal has to traverse the link between SS and LB twice, a violation of Constraint 3. Therefore, we have:

(4) Any placement of signal selectors in a G-DRI is a valid one with respect to the technology constraints as long as a signal does not start or terminate at an SS node.

In the case of multiple G-DRIs interconnecting a chain of rings, arbitrary placement of signal selectors for these G-DRIs does not work because of the conditions discussed in (2) and (3). However, (4) can be generalized to multiple G-DRIs if the conditions in (2) and (3) are satisfied.

(5) A placement of signal selectors for a sequence of G-DRIs interconnecting a chain of rings is a valid one as long as the conditions of (2) and (3) hold for every intermediate ring and a signal does not start at the SS node of the first ring and does not terminate at the SS node of the last ring.

Except in the situation described by (3), signal selectors can always be appropriately placed for a G-DRI to support a predefined direction of routing on each ring. That is, (6) Given a chain of rings interconnected by G-DRIs and a predefined direction of routing on each ring except the intermediate rings with overlapping hub nodes, there is always a way to place signal selectors for these G-DRIs such that those predefined ring routing directions are supported.

We will now describe the G-DRI model, which is similar to the previously described SRI model. First, a ring graph is constructed by creating a set of nodes and a set of links, where nodes represent rings and links represent G-DRI connections between rings. More specifically, we create a node for each ring and create a link between two nodes if the rings represented by the two nodes share at least one common node. Once the ring graph is constructed, the inter-ring routing path for a demand is computed as a shortest hop path in the ring graph from the demand's source ring to its destination ring. But unlike SRI routing, we need to define how G-DRIs should be constructed to interconnect the rings on the inter-ring path generated this way to make the whole path valid from a G-DRI perspective.

In accordance with the invention, it can be shown that for any shortest hop path between two given nodes in the ring graph, there is a way to construct G-DRIs and place signal selectors to make the path a valid G-DRI inter-ring path. It will be apparent to those skilled in the art that there can be many different valid configurations of G-DRI hub node selection and signal selector placement. Each configuration uniquely determines the direction of routing on each ring. This flexibility will be exploited in the load balancing procedure to be described in the intra-ring routing section.

The R-DRI model will now be described. In the R-DRI model, we enforce all five of the exemplary technology constraints given above. First, we will describe the additional limitations imposed by Constraint 5, with reference to FIG. 7. We have discovered that Constraint 5 makes a considerable difference in terms of signal selector placement flexibility.

Figure 7:
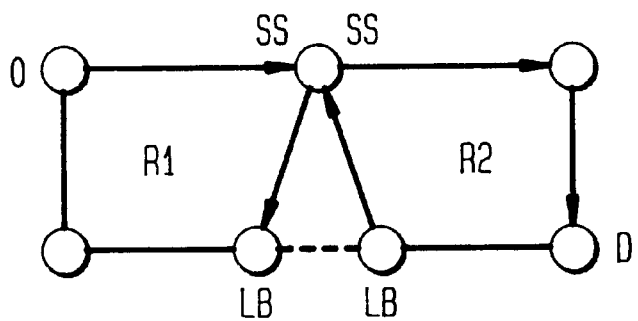
FIG. 7 shows an example of a unique configuration for a common node DRI.

In a common node R-DRI between rings R1 and R2, if the SS on R2 is not placed at the common node, then the copy of the signal which crosses rings from R1 to R2 at the common node has to traverse a ring link on R2 before it reaches the SS. Because this copy of the signal is considered high speed, by Constraint 5, it cannot be primary. But on the other hand, Constraint 1 says the primary has to cross rings via a common node, which is a contradiction. Therefore, the SS on R2 has to be at the common node. Similarly, the SS on R1 has to be at the common node for the reverse direction. FIG. 7 illustrates that once the locations of signal selectors are fixed, the direction of routing on each ring is uniquely determined. This result can be summarized as follows:

(7) In a common node R-DRI, the signal selectors have to be placed at the common node and the resulting routing is same side routing.

Figure 8:
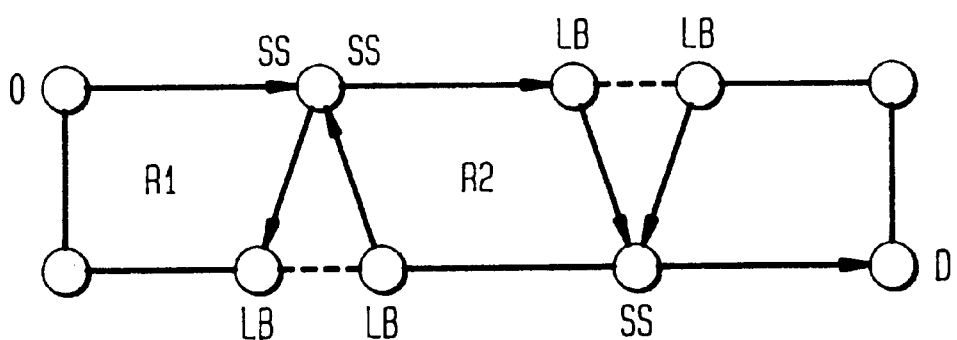
FIG. 8 shows an infeasible chain of common node DRIs.

Because of result (7), results (4), (5) and (6) no longer hold for the R-DRI model. Therefore the G-DRI model does not apply here. In fact, for an arbitrarily given chain of R-DRIs interconnecting a sequence of rings, a valid placement of signal selectors may not exist at all. For example, the R-DRI chain shown in FIG. 8 is an invalid R-DRI chain, even though each individual R-DRI in the chain is valid. This means that if we use a ring graph constructed for the G-DRI model, a path found may not necessarily be a valid one for the R-DRI model.

There are two problems with applying the G-DRI model ring graph in the R-DRI case. First, since a path found by applying a shortest path algorithm (or any other path search procedure) to the graph is not necessarily a valid one, we may have to repeat the shortest path procedure many times until we find a valid path. Also, there is no guarantee that we will eventually find a valid path because there is no mechanism built into either the graph or the shortest path algorithm to avoid invalid paths. Moreover, previously generated invalid paths do not offer any feedback to subsequent path searches. Second, even for a given path, it is not trivial to identify whether the path is valid or not. What needs to be done is basically to check all possible configurations of signal selector placement for the whole chain. The path is valid if there exists at least one feasible configuration.

In order to avoid these potential problems, we construct a new ring graph such that any path in the new graph is a valid path. To that end, we modify the original DRI definition as follows to provide an R-DRI definition which incorporates more restrictions. An R-DRI interworking between two rings is defined by specifying the following elements: two rings R1 and R2; two hub nodes A1 and B1 on R1; two hub nodes A2 and B2 on R2; pairing of (A1, A2) and (B1, B2); and signal selector placement, i.e., label one of A1, B1 as SS and the other LB, and similarly with A2 and B2. Note that compared with the previous definition, signal selector locations are specified in the R-DRI definition. If an R-DRI is a common node DRI, then according to result (7), the SSs have to be located at the common node in order for the R-DRI to be valid. It can therefore be assumed that we only define valid R-DRIs.

Since signal selector locations are fixed in the above R-DRI definition, the direction of routing on each ring is also fixed. If we put two R-DRIs together as a chain interconnecting three rings R1, R2 and R3, result (2) still holds here. That is, in order for the chain to be valid, the two R-DRIs must derive the same direction of routing on the middle ring R2. Therefore, in order to validate a chain of R-DRIs, we need to consider the directionality of a ring determined by each of the R-DRIs connecting the ring.

Figure 9:
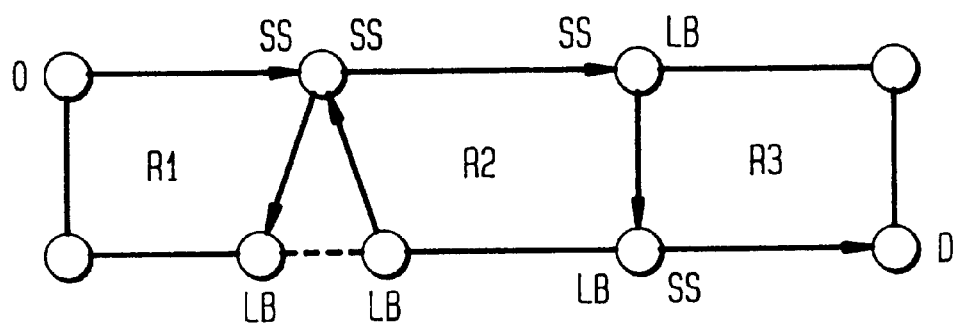
FIG. 9 shows an example of three rings interconnected by two DRIs.
Figure 10:
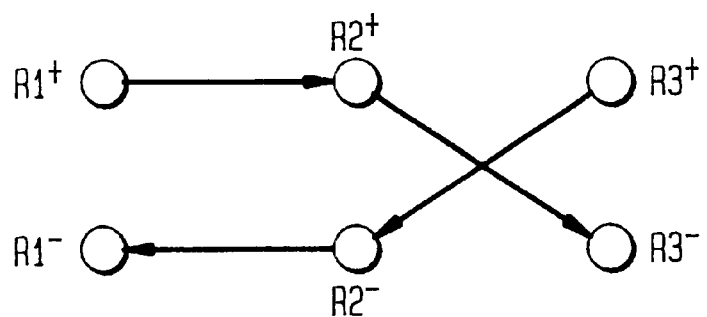
FIG. 10 is a ring graph representation of the ring network of FIG. 9.

Based on the above, we utilize the following ring graph construct for the R-DRI model: For each ring, there are two possible directions of routing. Arbitrarily label one of them as clockwise and the other counter-clockwise. The ring graph is then constructed as a directed graph. Each ring is represented by two nodes, one for the clockwise direction (e.g., R1+) and one for the counter-clockwise direction (e.g., R1−). Create a directed link from node A to node B if there exists an R-DRI connecting the two rings R1 and R2 which are represented by A and B respectively, and if the directions of routing on R1 and R2 induced by the R-DRI in the direction from R1 to R2 match the routing directions represented by A and B respectively. For example, the rings and R-DRIs illustrated in FIG. 9 are represented by the ring graph shown in FIG. 10. The reason we construct the ring graph in this manner is that we want any path in such a graph to be a valid path so that we can apply conventional shortest path algorithms to find inter-ring routing paths.

In accordance with the invention, it has been determined that if there is no R-DRI hub node overlap, any directed path in the ring graph is a valid path. For example, let rings R1, R2 and R3 be interconnected by two R-DRIs into a chain with R2 being the middle ring. Then there are two SSs and two LBs on R2. If the two SSs overlap, then R1 and R3 have a node in common. Moreover, it has also been determined that if at least one R-DRI is constructed for every pair of rings which share at least one common node, then any directed shortest hop path connecting two nodes in the ring graph is a valid path regardless of R-DRI node overlaps. This ensures that the ring graph can be used to determine proper inter-ring routing as long as we only take shortest hop paths. In case there exist multiple shortest hop paths, we can use this flexibility to optimize other objectives, such as ring assignment of demand end nodes.

We will now describe a method which assigns source rings and destination rings to demands and finds shortest hop routing in one step. We will describe the method for the G-DRI model and for the R-DRI model separately. In the G-DRI model, for each demand, we augment the ring graph by adding the source node and the destination node of the demand, and creating a link between the source node and every ring which shares the source node and between the destination node and every ring which shares the destination node. Then we apply a shortest path (i.e., shortest hop count) algorithm on this demand-specific network to find a path from the source node to the destination node. In the R-DRI model, the method is similar, but the network augmentation is slightly different because of the directionality of rings represented by nodes in the ring graph. Here we still add the source node and the destination node of the demand to the ring graph. However, we create directed links from the source node to all the nodes representing the rings which share the source node in both clockwise and counterclockwise directions, and from all the nodes representing the rings which share the destination node in both clockwise and counterclockwise directions to the destination node. Again, a shortest path algorithm can be applied to this demand specific network to find a directed path from the source node to the destination node.

3. Intra-Ring Routing

After we have generated an inter-ring route for a demand, the actual path the demand traverses is still not fixed because inside each ring on the inter-ring path, the signal can be routed in either a clockwise or counterclockwise direction, except in the R-DRI model where the routing direction is fixed. Since the size of a ring, and ultimately the cost of a ring, is determined by the maximum load of all the links on the ring, the intra-ring routing problem is to determine the optimal direction of routing for each demand inside a ring such that the load of the maximally loaded link is as small as possible. Conventional load balancing techniques have been used to solve intra-ring routing problems, and are described in, for example, C. Buyukkoc et al., "Load Balancing on SONET Rings," Proceedings of ICT '96, Istanbul, pp. 763–766, 1996, S. Cosares and I. Saniee, "An Optimization Problem Related to Balancing Loads on SONET Rings," Telecommunication Systems, Vol. 3, pp. 165–181, 1994, and A. Schrijver, P. Seymour, and P. Winkler, "The Ring Loading Problem," SIAM J. Discrete Math., all of which are incorporated by reference herein.

We will now describe load balancing issues which are specific to the SRI model and the two DRI models described previously. There is a basic difference between DRI and SRI in general regarding load balancing on a ring. For SRI, if we flip a demand on a ring (i.e., change the direction of routing for that demand on the ring), all the links of the ring on the current path of the demand are deloaded, and all the complementary links on the ring are loaded. For DRI, however, the DRI links (one link for a source or destination ring and two links for intermediate rings) are always loaded regardless of whether we flip the demand or not. Load balancing algorithms therefore need to be altered to reflect this difference.

In the SRI model and the G-DRI model, hub nodes are not uniquely specified. In the SRI model, if two rings share multiple common nodes, then any of these nodes can serve as the hub. In the G-DRI model, if two rings share multiple common nodes, any of these nodes can serve as one pair of hub nodes. The second pair of hub nodes can then be chosen from 2-combinations of the four candidate nodes which are adjacent to the hub node on each of the two rings. So even when the two rings have only one node in common, there are still four possible ways to choose the second hub pair. This non-uniqueness of hub node choice provides added flexibility, beyond the two possible directions of intra-ring routing, which can be exploited in load balancing. Conventional "greedy" type load balancing algorithms can be modified to take advantage of this added flexibility.

Finally, we will describe how load balancing can be done for the R-DRI model. Because of the way the ring graph is constructed in the R-DRI case, an inter-ring path not only specifies rings on the path, but also the intra-ring routing directions on each ring. Unlike in the G-DRI model, in order to do load balancing for the R-DRI model, we need to change the inter-ring path of a demand. The basic idea is to change the path locally such that the new path still traverses the same set of nodes in the ring graph, except the node representing the ring under consideration for load balancing. Instead, the new path traverses the other node representing the same ring but in the opposite intra-ring routing direction. This idea is illustrated by the following example.

Figure 11:
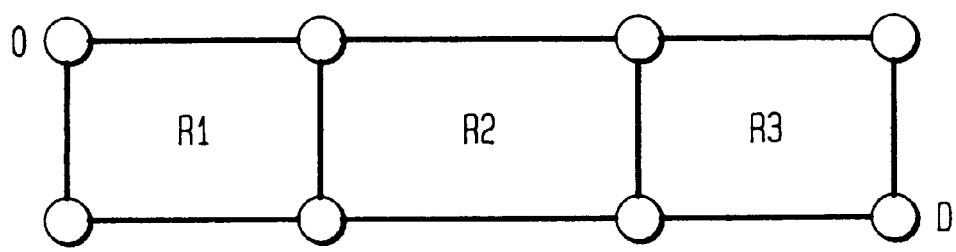
FIG. 11 shows an example of three rings which may be interconnected by many DRIs.
Figure 12:
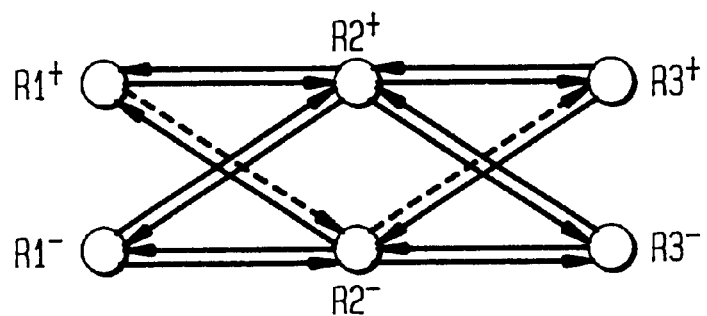
FIG. 12 is a ring graph representation of the ring network of FIG. 11.

FIG. 11 shows three rings R1, R2 and R3 which are assumed to be interconnected by eight DRIs. FIG. 12 shows the corresponding ring graph. There are four DRIs between R1 and R2, two of which are same side routing and two of which are opposite side routing, corresponding to four possible configurations of SS locations. Similarly, there are four DRIs between R2 and R3. If we consider the directionality of the DRIs, there are sixteen directed links interconnecting six nodes in the ring graph as shown in FIG. 12. Suppose we have a inter-ring path from R1+ to R2+ to R3+ and we want to do load balancing on R2. Since the current path traverses R2 in the clockwise direction as represented by R2+, we would like to change the path such that R2− will be traversed instead and no other nodes are affected. The new path after load balancing on R2 is the path marked by the dashed lines in FIG. 12.

Unlike in the SRI model and the G-DRI model, the intra-ring routing of a demand in the R-DRI model is not always flippable. If it is, then it has to use different DRIs (per the R-DRI definition). Therefore, the potential for load balancing in the R-DRI model thus depends on the amount of DRI connectivity in the ring graph.

4. Ring Deloading

Because shortest path routing is a "greedy" type of technique which only looks at one demand at a time and ignores the overall capacity utilization, it usually results in a sub-optimal solution. Ring deloading is designed to reroute less efficiently routed traffic in order to improve the optimality of the solution. To avoid ambiguity, we define the following terms: A traffic unit is the unit in which demands are measured, such as DS3. A ring unit is the bit rate capacity of the type of ring under consideration, such as OC-48 or OC-3, translated to traffic units, such as 48 DS3s or 3 DS3s. A maximal link of a ring is a link whose load is the largest among all the links on the ring. The size of a ring is the number of ring units it has, such as 4 OC-48s. The capacity of a ring is the product of ring size and ring unit in traffic units. The idle capacity of a link is the difference of ring capacity and link load in traffic units. The idle capacity of a ring is the minimum of its link idle capacities.

Ring size is determined by the load of the maximal link(s) divided by the ring unit and rounding up to the nearest integer. Because of the rounding, the last ring unit of a ring is usually not full. The basic idea of ring deloading is to get rid of the least filled ring units of some rings by rerouting some of the demands on these rings via the idle capacities of links on other rings. Conceptually, ring deloading has the following four steps: demand classification, ring identification, demand selection, and rerouting, although these steps can be implemented in a single integrated algorithm.

Demand classification identifies which demands are reroutable and which are not. Each demand can be classified as one of the following types:

1. Fixed: demands whose routings are fixed by the user
2. Non-fixed: Intra-ring demands
   2A. Demands whose end points have multiple ring choices
   2B. Demands whose end points have a single ring choice
3. Non-fixed: Inter-ring demands
   3A. Demands whose end points have multiple ring choices
   3B. Demands whose end points have a single ring choice
      3Ba. Demands which have multiple inter-ring routes
      3Bb. Demands which have a single inter-ring route In general, only demands of types 2A, 3A, 3Ba are reroutable for ring deloading purposes.

An exemplary deloading algorithm suitable for use in conjunction with the invention iteratively chooses a best candidate ring to deload. The criteria used for ring selection is to choose a ring with maximum idle capacity. If there are multiple rings with the same idle capacity, we choose the ring with the largest size. If a tie still exists, it is broken arbitrarily. Once a ring to be deloaded is identified, the algorithm attempts to remove some of the demands such that the ring size can be reduced by 1. The demands are selected and removed one at a time. Demand selection has two objectives: First, a demand has to be reroutable via other rings. Second, overall we want to remove as few demands as possible while at the same time the resulting ring (after its size is reduced by 1) should have as a small an idle capacity as possible. A demand selection problem with these objectives, if formulated as an optimization problem, may be viewed as a generalized version of bin-packing. Therefore, the problem itself is a so-called "NP-hard" problem.

After a demand is selected for deloading a ring, it is temporarily removed from the entire path of its current route. As a result, it is also temporarily deloaded from the ring. Then we search for an alternate path such that the new path does not traverse the deloaded ring and all the links on the new path have sufficient idle capacity to accommodate the demand. If the search is successful, we change the routing of the demand and update the capacities of rings. Otherwise, we restore the demand to its original routing. This deloading algorithm may be implemented using two loops, with each identified ring starting an outer loop and each selected demand starting an inner loop. Of course, it is not guaranteed that every ring can be successfully deloaded. Therefore, routing changes are temporary until the completion of each iteration in the outer loop. Suitable implementations of the deloading algorithm will be apparent to those skilled in the art, and are therefore not further described herein.

5. A Hybrid Architecture for Ring Routing for the G-DRI Model

This section describes an exemplary implementation of the G-DRI ring routing techniques of the previous sections. As described earlier, for a ring network configured in accordance with the G-DRI model, inter-ring routing and intra-ring routing are separable operations. The invention may thus be implemented in a hybrid centralized/distributed network architecture which takes the advantage of this separability. However, it should be noted that the separability generally does not extend to the R-DRI case and hence, the hybrid approach to be described below does not apply to the R-DRI model. It will be assumed in this section that the implementation is in the form of a network of rings where each node is capable of performing computing and provisioning operations. As noted previously, the conventional implementation approach for a ring network utilizes a centralized architecture in which all computation is done at a central provisioning operations system (OS). All of the ring routing algorithms are implemented at the central provisioning OS and the necessary information is then downloaded to each node. It is generally assumed in this conventional centralized approach that the central OS has all necessary information on the entire network up to date. The central OS computes an end-to-end path for each demand and then sends instruction messages to each node on the path to activate the provisioning. Significant problems associated with the centralized approach include its limited speed and scalability.

Figure 13:
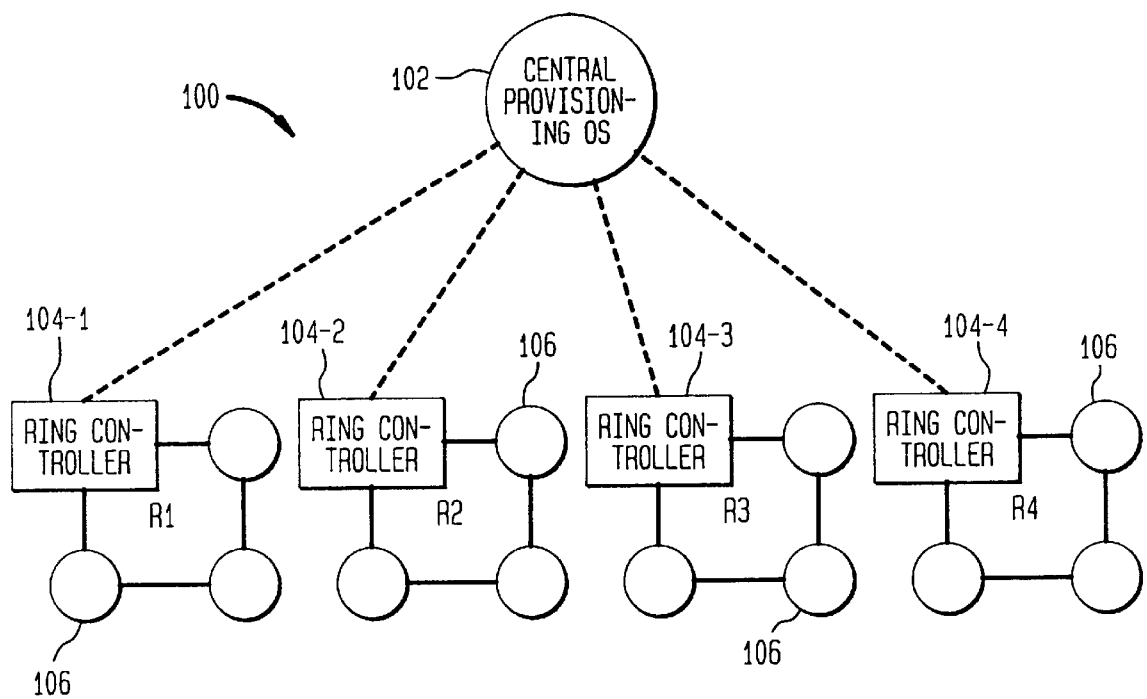
FIG. 13 is a block diagram illustrating a hybrid network architecture in accordance with an exemplary embodiment of the invention.

FIG. 13 illustrates a system 100 which implements the above-noted hybrid centralized/distributed architecture. The system 100 includes a central provisioning OS 102 and a ring network including four interconnected rings R1, R2, R3 and R4. Each of the rings R1 through R4 includes a ring controller node 104-i, i=1, 2, 3, 4, designated by a square and three additional nodes 106 each designated by a circle. It should be understood that the ring network in system 100 has been simplified for purposes of illustration, and the described techniques can be applied to a ring network of arbitrary size and configuration. Computation and provisioning operations in the system 100 are divided between the central OS 102 and the ring controllers 104-i, as will be described in greater detail below.

Figure 14:
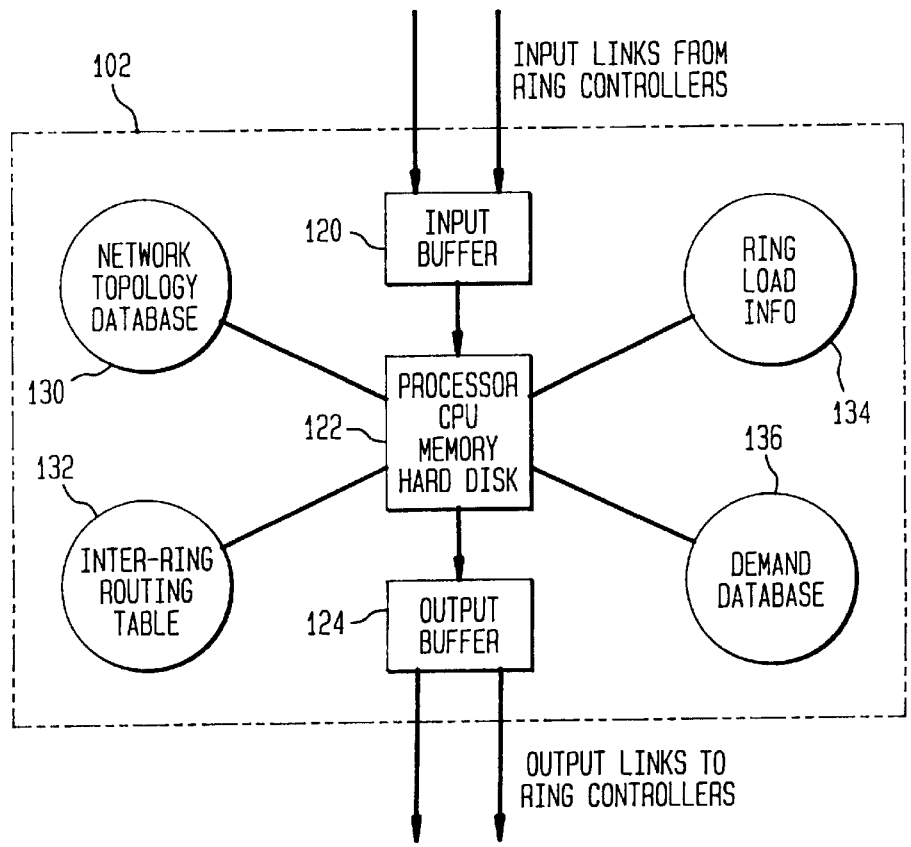
FIG. 14 shows the central provisioning operation system (OS) of FIG. 13 in greater detail.

FIG. 14 shows a more detailed view of the central OS 102 of FIG. 13. Input links from the ring controllers 104-i are coupled to an input buffer 120 which is in turn coupled to a processor 122. The processor 122 in this embodiment includes as elements thereof a central processing unit (CPU), a memory and a hard disk, but may be any other type of digital data processor. The central OS 102 also includes an output buffer 124 which is arranged between the processor 122 and output links to the ring controllers 104-i. The central OS 102 further includes a network topology database 130, an inter-ring routing table 132, a set of ring load information 134, and a demand database 136. The elements 130, 132, 134 and 136 may be implemented separately as shown using electronic, magnetic or optical storage devices, or as part of the memory or hard disk associated with the processor 122. The central OS 102 is more generally referred to herein as a central controller, and numerous alternative central controllers may be used to provide the centralized functions in system 100.

Figure 15:
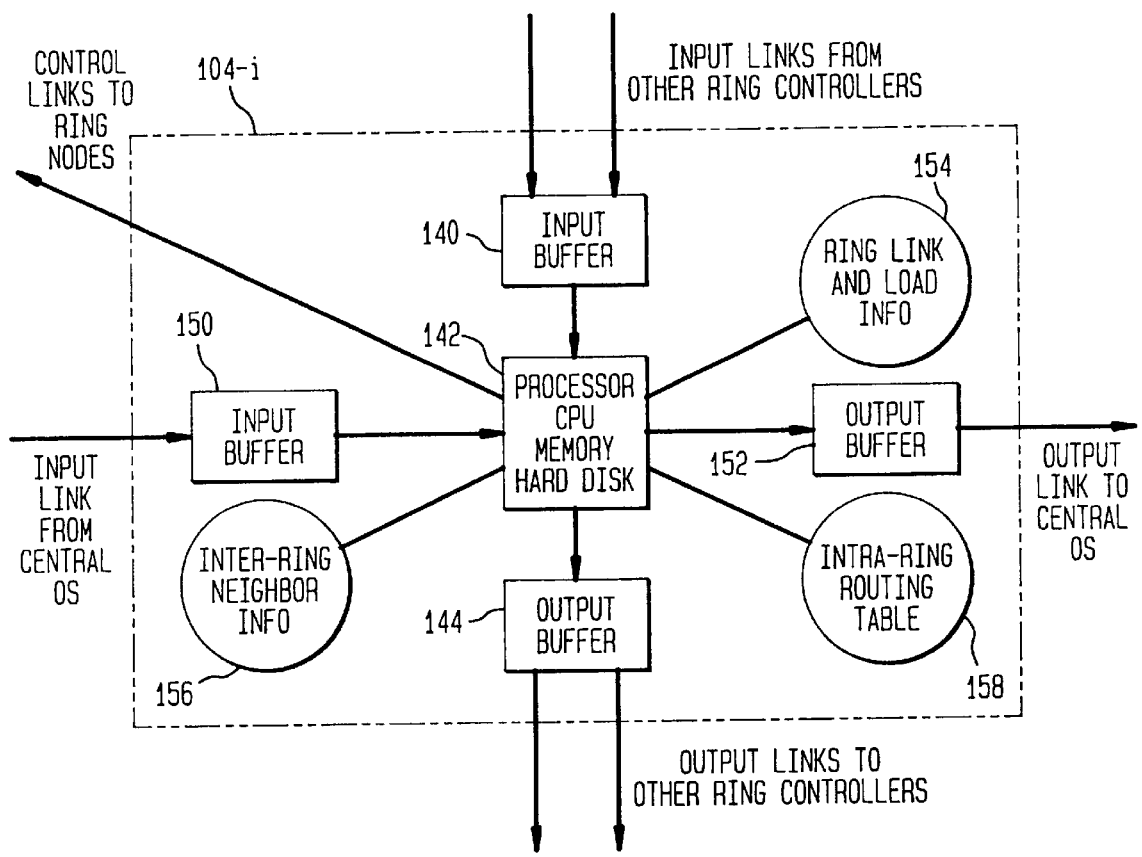
FIG. 15 shows one of the ring controllers of FIG. 13 in greater detail.

FIG. 15 shows a more detailed view of one of the ring controllers 104-i of FIG. 13. Input links from other ring controllers are coupled to an input buffer 140 which is in turn coupled to a processor 142. Like the processor 122 in the central OS 102, the processor 142 includes as elements thereof a CPU, a memory and a hard disk, but may be any other type of digital data processor. The ring controller 104-i also includes an output buffer 144 which is arranged between the processor 142 and output links to the other ring controllers. An input link from the central OS 102 is coupled via an input buffer 150 to the processor 142, and the processor 142 is coupled via an output buffer 152 to an output link to the central OS 102. The ring controller 104-i further includes a set of ring link and load information 154, a set of inter-ring neighbor information 156, and an intra-ring routing table 158. The elements 154, 156 and 158 may be implemented separately as shown using electronic, magnetic or optical storage devices, or as part of the memory or hard disk associated with the processor 142.

In this embodiment, the central OS 102 stores information regarding the ring graph, as described in the inter-ring routing section, and computes the inter-ring path for each demand. An inter-ring path is essentially a sequence of interconnected rings. Once the inter-ring path of a demand is computed, the central OS 102 sends the path information to the ring controller 104-i of each ring on the path. These ring controllers 104-i then determine the interworking nodes and intra-ring routing by themselves locally, and then activate the provisioning of the complete path for the demand. More specifically, the following steps may be used to compute and provision a path for a demand in the system 100:

1. For each demand, the central OS 102 determines a source ring and a destination ring respectively for the demand.

2. The central OS 102 computes an inter-ring path for the demand using a shortest path algorithm over the ring graph. For further optimization, each ring may update the central OS 102 with its current ring load, i.e., the load of the maximally loaded link in that ring. This is the ring load information in element 134 of FIG. 14. With this information available, the shortest path algorithm may be modified so as to use the rings more selectively.

3. After an inter-ring path is computed, the central OS 102 sends a message to the ring controller 104-i of each ring on the path. The following information is generally included in the message: whether the ring is a source ring (and if so its source node), destination ring (and if so its destination node) or a transit ring, its left ring and its right ring, and the identifier and the size of the demand.

4. Upon receiving the message, each ring controller 104-i first waits for the decision on the interworking nodes with its left neighboring ring (this decision is to be made by the left ring). The only exception is the source ring which doesn't need to wait because the source node can be viewed as the left interworking node for that ring. It then determines the interworking nodes (if not unique) with its right neighboring ring solely based on its own interest (e.g., load balancing). The destination ring doesn't need to determine its right interworking node because the destination node can be viewed as the right interworking node for that ring. Once both interworking nodes are determined, the ring controller 104-i performs load balancing and generates the intra-ring path for the demand.

5. Provisioning is then activated piece-by-piece by each ring controller 104-i involved in the path for the demand.

In the above illustrative embodiment, once the inter-ring path is determined, the actual interworking nodes between rings and intra-ring routing on each ring are determined one ring at a time from the source ring to the destination ring. An end-to-end routing path generated in this manner is guaranteed to be feasible for the SRI and the G-DRI models described herein. As previously noted, the hybrid approach illustrated in FIGS. 13–15 is generally not applicable to the R-DRI model. However, the hybrid approach may be applied in ring network applications subject to other sets of suitable constraints.

It should be emphasized that the ring routing techniques illustrated and described herein are exemplary and should not be construed as limiting the present invention to any particular embodiment or group of embodiments. In addition, the techniques can be implemented in a variety of different applications. For example, the techniques can be implemented in a network design software tool, such as the Integrated Network Design Toolkit (INDT) described in B. Doshi, S. Dravida, and P. Harshavardhana, "Overview of INDT—A New Tool for Next Generation Network Design," Proceedings of IEEE GLOBECOM, November, 1995, which is incorporated by reference herein. These and numerous alternative embodiments within the scope of the appended claims will be readily apparent to those skilled in the art.

What is claimed is:

1. A method for use in routing a traffic demand through a ring network, the method comprising the steps of:

determining an inter-ring path for the demand through at least a portion of the ring network;

determining an intra-ring path for the demand on each ring in the inter-ring path, wherein the determination of the intra-ring path for at least a subset of the rings in the inter-ring path is independent of the determination of the inter-ring path; and providing information regarding current ring load from each of at least a subset of the rings in the inter-ring path to a central controller, such that the information can be used in the step of determining the inter-ring path for the demand.

2. The method of claim 1 wherein the step of determining an intra-ring path on each ring in the inter-ring path further includes the step of independently determining a routing direction for the demand on at least a subset of the rings in the inter-ring path.

3. The method of claim 1 wherein the step of determining an intra-ring path on each ring in the inter-ring path further includes the step of independently determining interworking nodes for an interworking function for at least a subset of the rings in the inter-ring path.

4. The method of claim 1 wherein at least a subset of the rings in the inter-ring path implement a single ring interworking (SRI) function.

5. The method of claim 1 wherein at least a subset of the rings in the inter-ring path implement a dual ring interworking (DRI) function.

6. A method for use in routing a traffic demand through a ring network, the method comprising the steps of:

determining an inter-ring path for the demand through at least a portion of the ring network; and determining an intra-ring path for the demand on each ring in the inter-ring path, wherein the determination of the intra-ring path for at least a subset of the rings in the inter-ring path is independent of the determination of the inter-ring path;

wherein the step of determining an inter-ring path for the demand is implemented in a central controller associated with the network, the method further including the step of transmitting information from the central controller to a ring controller of each of the rings in the inter-ring path, the information for a given ring including an indication as to whether the given ring is a source ring, a destination ring or a transit ring, its neighboring rings, and an identifier and size of the demand.

7. A method for use in routing a traffic demand through a ring network, the method comprising the steps of:

determining an inter-ring path for the demand through at least a portion of the ring network; and determining an intra-ring path for the demand on each ring in the inter-ring path, wherein the determination of the intra-ring path for at least a subset of the rings in the inter-ring path is independent of the determination of the inter-ring path;

wherein the step of determining an inter-ring path includes the steps of (i) generating a ring graph in which nodes represent rings in the network and links represent ring interconnections in the network, and (ii) applying a path selection algorithm to the ring graph.

8. The method of claim 7 wherein the ring graph includes a node for each of two different directions of routing available on at least one of the rings in the network.

9. A method for use in routing a traffic demand through a ring network, the method comprising the steps of:

determining an inter-ring path for the demand through at least a portion of the ring network; and determining an intra-ring path for the demand on each ring in the inter-ring path, wherein the determination of the intra-ring path for at least a subset of the rings in the inter-ring path is independent of the determination of the inter-ring path; and wherein the path for the demand is subject to at least a subset of the following constraints: (i) a primary signal associated with the demand has to cross between a pair of rings via a common node; (ii) a given pair of primary signals traveling in respective clockwise and counter-clockwise directions on a given ring traverse the same physical path; (iii) no demand can traverse the same link twice; (iv) a signal cannot enter a ring via a low speed link and leave a link via a low speed link without traversing a high speed ring link; and (v) signal selectors in interworking functions always select a signal from a low speed link as the primary signal.

10. An apparatus for routing a traffic demand through a ring network comprising a plurality of interconnected rings of nodes, the apparatus comprising:

a central controller operative to determine an inter-ring path for the demand through at least a portion of the ring network; and a plurality of ring controllers, each coupled to the central controller and associated with one of the rings in the inter-ring path, wherein each of the ring controllers is operative to determine an intra-ring path for the demand on its corresponding ring, such that the determination of the intra-ring path for at least a subset of the rings in the inter-ring path is independent of the determination of the inter-ring path;

wherein at least a subset of the ring controllers provide information regarding current ring load to the central controller, such that the information can be used in the central controller to determine the inter-ring path for the demand.

11. The apparatus of claim 10 wherein at least a subset of the plurality of ring controllers are each operative to determine an intra-ring path on the corresponding ring in the inter-ring path by independently determining a routing direction for the demand on that ring.

12. The apparatus of claim 10 wherein at least a subset of the plurality of ring controllers are each operative to determine an intra-ring path on the corresponding ring in the inter-ring path by independently determining interworking nodes for an interworking function for that ring.

13. The apparatus of claim 10 wherein at least a subset of the rings in the inter-ring path implement a single ring interworking (SRI) function.

14. The apparatus of claim 10 wherein at least a subset of the rings in the inter-ring path implement a dual ring interworking (DRI) function.

15. An apparatus for routing a traffic demand through a ring network comprising a plurality of interconnected rings of nodes, the apparatus comprising:

a central controller operative to determine an inter-ring path for the demand through at least a portion of the ring network; and a plurality of ring controllers, each coupled to the central controller and associated with one of the rings in the inter-ring path, wherein each of the ring controllers is operative to determine an intra-ring path for the demand on its corresponding ring, such that the determination of the intra-ring path for at least a subset of the rings in the inter-ring path is independent of the determination of the inter-ring path;

wherein the central controller is further operative to transmit information to at least a subset of the ring controllers associated with the rings in the inter-ring path, the information for a given ring including an indication as to whether the given ring is a source ring, a destination ring or a transit ring, its neighboring rings, and an identifier and size of the demand.

16. An apparatus for routing a traffic demand through a ring network comprising a plurality of interconnected rings of nodes, the apparatus comprising:

a central controller operative to determine an inter-ring path for the demand through at least a portion of the ring network; and a plurality of ring controllers, each coupled to the central controller and associated with one of the rings in the inter-ring path, wherein each of the ring controllers is operative to determine an intra-ring path for the demand on its corresponding ring, such that the determination of the intra-ring path for at least a subset of the rings in the inter-ring path is independent of the determination of the inter-ring path;

wherein the central controller is operative to determine an inter-ring path for the demand by (i) generating a ring graph in which nodes represent rings in the network and links represent ring interconnections in the network, and (ii) applying a path selection algorithm to the ring graph.

17. The apparatus of claim 16 wherein the ring graph includes a node for each of two different directions of routing available on at least one of the rings in the network.

18. An apparatus for routing a traffic demand through a ring network comprising a plurality of interconnected rings of nodes, the apparatus comprising: a central controller operative to determine an inter-ring path for the demand through at least a portion of the ring network; and a plurality of ring controllers, each coupled to the central controller and associated with one of the rings in the inter-ring path, wherein each of the ring controllers is operative to determine an intra-ring path for the demand on its corresponding ring, such that the determination of the intra-ring path for at least a subset of the rings in the inter-ring path is independent of the determination of the inter-ring path;

wherein the path for the demand is subject to at least a subset of the following constraints: (i) a primary signal associated with the demand has to cross between a pair of rings via a common node; (ii) a given pair of primary signals traveling in respective clockwise and counterclockwise directions on a given ring traverse the same physical path; (iii) no demand can traverse the same link twice; (iv) a signal cannot enter a ring via a low speed link and leave a link via a low speed link without traversing a high speed ring link; and (v) signal selectors in interworking functions always select a signal from a low speed link as the primary signal.

* * * * *